United States Patent Office.

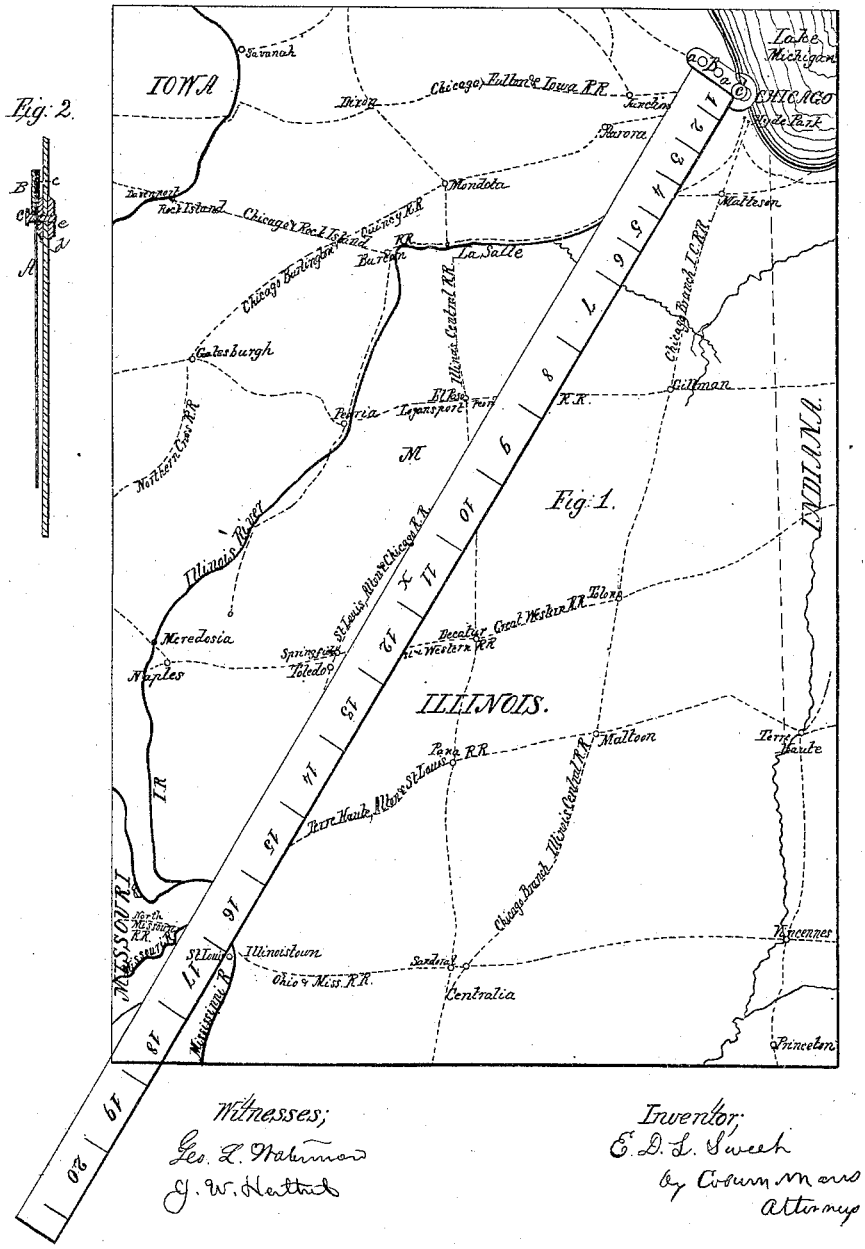

EDWARD DE LOSS SWEET, OF CHICAGO, ILLINOIS.

Letters Patent No. 61,116, dated January 8, 1867.

IMPROVEMENT IN TARIFF INDICATORS FOR TELEGRAPHS.

The Schedule referred to in these Letters Patent and making part of the same.

TO ALL WHOM IT MAY CONCERN:

Be it known that I, EDWARD DE LOSS SWEET, of Chicago, in the county of Cook, and State of Illinois, have invented a new and useful Improvement in Telegraph Tariff Indicators; and I do hereby declare and make known that the following is a full, clear, and exact description thereof, reference being had to the accompanying drawings, and the letters and figures marked thereon, which form part of this specification.

My said invention consists in the employment of a tape, or its equivalent, divided or marked off into spaces, which are numbered 1, 2, 3, and upwards, to any desired number; said spaces corresponding with distances for which the variable rates or tariffs are determined, from the lowest to the highest, the said tape being pivoted at one end to the point upon a map of determined proportions, representing a telegraph office, so that, by arranging said tape upon the map in a line between the said office and the point to which the message is to be sent, the number marked upon that division of the tape which lies upon said last-mentioned point will indicate, in a chart or key upon said map, the rate or tariff to be charged for the message, as hereinafter more fully set forth and explained.

To enable those skilled in the art to understand how to construct and use my said invention, I will proceed to describe the same with particularity, making reference in so doing to the aforesaid drawings, in which—

Figure 1 represents a plan view of my said invention; and

Figure 2, a sectional view of the device whereby the same is secured or pivoted to the map.

A represents the aforesaid tape, which is secured upon and to the map M at any desired point, as shown, the end being secured between two plates, B and C, by rivets or screws, $a$, and a rivet or bolt, $c$, passing through one of said plates, (C,) and also through the two circular plates $d\ e$, arranged upon each side of the map, as shown, so that said tape may readily be moved around upon said rivet or bolt $c$, as desired. The said tape is marked off into spaces or divisions and numbered, as shown; said spaces and numbers corresponding upon the map with those distances or points at which the tariff is to be increased or diminished, the space marked one covering all distances over which messages are sent at the lowest tariff or rate; space 2 covering all distances for which the next higher tariff rate is charged, and so on. The different tariffs corresponding with the numbers indicated upon the tape may be printed upon some part of the map, or elsewhere, for reference, or may be committed to memory, as may be preferred. If it were desired to ascertain the tariff from Chicago to St. Louis, the tape, being arranged in a right line between the two points, would show St. Louis as corresponding with division 16 upon the tape; and by referring to the chart or key, or to his memory, the operator would know at once the tariff between said points, or between any two points whose distance apart would be indicated by said division 16 upon the tape. Should the rates at any time be increased or diminished, the same indicator could be employed by merely proportionally lengthening or shortening the spaces upon said tape.

Having described the nature and operation of my invention, I will now specify what I claim and desire to secure by Letters Patent.

I claim, in combination with a map M, the arrangement of a tape, or its equivalent, divided into spaces or divisions, numbered as shown, said spaces being so proportioned as to indicate upon said map the variable tariffs adopted for varying distances, substantially as herein described and shown.

E. D. L. SWEET.

Witnesses:
J. G. SWEET,
W. E. MARRS.